United States Patent
Chakraborty et al.

(10) Patent No.: US 10,323,463 B2
(45) Date of Patent: Jun. 18, 2019

(54) METHODS OF MAKING DIAMOND TABLES, CUTTING ELEMENTS, AND EARTH-BORING TOOLS

(71) Applicant: Baker Hughes Incorporated, Houston, TX (US)

(72) Inventors: Soma Chakraborty, Houston, TX (US); Oleksandr V. Kuznetsov, Manvel, TX (US); Gaurav Agrawal, Aurora, CO (US)

(73) Assignee: Baker Hughes Incorporated, Houston, TX (US)

(*) Notice: Subject to any disclaimer, the term of this patent is extended or adjusted under 35 U.S.C. 154(b) by 196 days.

(21) Appl. No.: 15/466,602

(22) Filed: Mar. 22, 2017

(65) Prior Publication Data

US 2017/0191318 A1 Jul. 6, 2017

Related U.S. Application Data

(63) Continuation of application No. 14/493,777, filed on Sep. 23, 2014, now Pat. No. 9,611,699, which is a (Continued)

(51) Int. Cl.
*B24D 3/02* (2006.01)
*B24D 18/00* (2006.01)
(Continued)

(52) U.S. Cl.
CPC .......... *E21B 10/5735* (2013.01); *B24D 18/00* (2013.01); *B24D 18/0009* (2013.01);
(Continued)

(58) Field of Classification Search
USPC .......................................... 51/293, 307, 309
See application file for complete search history.

(56) References Cited

U.S. PATENT DOCUMENTS 3,745,623 A 7/1973 Wentorf, Jr. et al.
4,220,455 A 9/1980 St. Pierre et al.
(Continued)

FOREIGN PATENT DOCUMENTS

CN 101263083 A 9/2008
CN 101324175 A 12/2008
(Continued)

OTHER PUBLICATIONS

Yao Tong et al: "Graphene based material and their composites as coatings", Austin Journal of Nanomedicine & Nanotechnology, vol. 1, Dec. 31, 2013 (Dec. 31, 2013), p. 1003.
(Continued)

*Primary Examiner* — James E McDonough
(74) *Attorney, Agent, or Firm* — TraskBritt

(57) ABSTRACT

Methods of making cutting elements for earth-boring tools may involve placing a powdered mixture into a mold. The powdered mixture may include a plurality of core particles comprising a diamond material and having an average diameter of between 1 µm and 500 µm, a coating material adhered to and covering at least a portion of an outer surface of each core particle of the plurality of core particles, the coating material comprising an amine terminated group, and a plurality of nanoparticles selected from the group consisting of carbon nanotubes, nanographite, nanographene, non-diamond carbon allotropes, surface modified nanodiamond, nanoscale particles of BeO, and nanoscale particles comprising a Group VIIIA element adhered to the coating material. The powdered mixture may be sintered to form a polycrystalline diamond table. The polycrystalline diamond table may be attached to a substrate.

20 Claims, 7 Drawing Sheets

Related U.S. Application Data continuation of application No. 13/166,557, filed on Jun. 22, 2011, now Pat. No. 8,840,693.

(51) Int. Cl.
| | | |
|---|---|---|
| *C09K 3/14* | (2006.01) | |
| *E21B 10/573* | (2006.01) | |
| *E21B 10/567* | (2006.01) | |
| *B82Y 30/00* | (2011.01) | |
| *B24D 3/00* | (2006.01) | |
| *B24D 11/00* | (2006.01) | |
| *E21B 10/54* | (2006.01) | |

(52) U.S. Cl.
CPC ............ *B82Y 30/00* (2013.01); *C09K 3/1436* (2013.01); *E21B 10/567* (2013.01); *E21B 10/54* (2013.01)

(56) References Cited

U.S. PATENT DOCUMENTS

| | | | |
|---|---|---|---|
| 4,960,643 A | 10/1990 | Lamelson | |
| 5,127,923 A | 7/1992 | Bunting et al. | |
| 5,151,107 A * | 9/1992 | Cho | B01J 3/062 51/293 |
| 5,759,216 A | 6/1998 | Kanada et al. | |
| 5,766,394 A | 6/1998 | Anderson et al. | |
| 5,954,147 A | 9/1999 | Overstreet et al. | |
| 6,372,002 B1 | 4/2002 | D'Evelyn et al. | |
| 8,020,621 B2 | 9/2011 | DiFoggio et al. | |
| 8,840,693 B2 * | 9/2014 | Chakraborty | C09K 3/1436 51/295 |
| 2004/0110005 A1 | 6/2004 | Choi et al. | |
| 2004/0136892 A1 | 7/2004 | Davies et al. | |
| 2004/0141865 A1 | 7/2004 | Keshavan et al. | |
| 2007/0056778 A1 | 3/2007 | Webb et al. | |
| 2008/0073126 A1 | 3/2008 | Shen et al. | |
| 2008/0085407 A1 | 4/2008 | Cooley et al. | |
| 2008/0127475 A1 | 6/2008 | Griffo | |
| 2008/0202821 A1 | 8/2008 | McClain et al. | |
| 2008/0302579 A1 | 12/2008 | Keshavan et al. | |
| 2009/0139698 A1 | 6/2009 | Robinson | |
| 2009/0218276 A1 | 9/2009 | Linford et al. | |
| 2009/0277839 A1 * | 11/2009 | Linford | B01J 13/02 210/656 |
| 2009/0297854 A1 | 12/2009 | Lee et al. | |
| 2010/0123746 A1 | 5/2010 | Wu | |
| 2010/0151318 A1 | 6/2010 | Lopatin et al. | |
| 2010/0203391 A1 | 8/2010 | Lopatin et al. | |
| 2010/0213131 A1 * | 8/2010 | Linford | B01J 13/02 210/656 |
| 2010/0230174 A1 | 9/2010 | Scott et al. | |
| 2011/0031034 A1 | 2/2011 | DiGiovanni et al. | |
| 2011/0061942 A1 | 3/2011 | DiGiovanni et al. | |
| 2011/0200825 A1 | 8/2011 | Chakraborty et al. | |
| 2012/0037431 A1 | 2/2012 | DiGiovanni et al. | |
| 2012/0102843 A1 | 5/2012 | Chakraborty et al. | |
| 2012/0202067 A1 | 8/2012 | Chakraborty et al. | |
| 2012/0324799 A1 | 12/2012 | Chakraborty et al. | |
| 2015/0336801 A1 | 11/2015 | Chakraborty et al. | |

FOREIGN PATENT DOCUMENTS

| | | |
|---|---|---|
| CN | 101428786 A | 5/2009 |
| CN | 101463472 A | 6/2009 |
| CN | 101469417 A | 7/2009 |
| CN | 101772615 A | 7/2010 |
| WO | 2004040029 | 5/2004 |

OTHER PUBLICATIONS

Kuznetsov, V. L. et al. "Electrical resistivity of graphitized ultra-disperse diamond and onion-like carbon" Chem. Phys. Letters 336 (Mar. 23, 2001) pp. 397-404.
European Office Action for European Application No. 11868188.1 dated Sep. 15, 2017, 4 pages.
Chinese Office Action and Search Report for Chinese Application No. 201180072548.1 dated Apr. 3, 2015, 11 pages.
Supplementary European Search Report and Opinion for European Application No. EP11868188, dated Jul. 8, 2016, 5 pages.
Hwang, Kuo Chu et al., "Facile Surface Functionalization of Nanodiamonds", American Chemical Society/Langmuir 26 (5) (2010) pp. 3685-3689.
International Preliminary Report on Patentability for International Application No. PCT/US2011/057879, dated Dec. 23, 2013, 4 pages.
International Search Report for International Application No. PCT/US2011/057879 dated May 30, 3012, 3 pages.
International Written Opinion for International Application No. PCT/US2011/057879 dated May 30, 3012, 3 pages.
Lee et al., Layer-by-Layer Assembly of All Carbon Nanotube Ultrthin Films for Electrochemical Applications, Jourtnal of the American Chemical Society (2009), Vo. 131, No. 2, pp. 671-679.
Saini et al., Core-Shell Diamond as a Support for Solid-Phase Extraction and High-Performance Liquid Chromatigraphy, 82 Analytical Chem. 4448 (Jun. 1, 2010), pp. 4448-4456.
Second Chinese Office Action for Chinese Application No. 201180072548.1 dated Dec. 4, 2015, 5 pages.
Struers, Dia Duo Brochure, http://www.struers.com/resources/elements/12/164618/DiaDuo-2_BrochureEnglish.pdf , visited Oct. 6, 2010, 2 pages.
Struers, DiaDuo-2 diamond suspension and cooling lubricant, http://www.struers.com/default.asp?top_id=2&main_id=58&doc_id=506 , visited Oct. 6, 2010, 1 page.
Tong et al., Graphene Based Materials and Thier Composites as Coatings, Austin Jounal of Nanomedicine & Nanotechnology, vol. 1, Issue 1, (2013), 16 pages.

* cited by examiner

METHODS OF MAKING DIAMOND TABLES, CUTTING ELEMENTS, AND EARTH-BORING TOOLS

CROSS-REFERENCE TO RELATED APPLICATIONS

This application is a continuation of U.S. patent application Ser. No. 14/493,777, filed Sep. 23, 2014, now U.S. Pat. No. 9,611,699, issued Apr. 4, 2017, which is a continuation of U.S. patent application Ser. No. 13/166,557, filed Jun. 22, 2011, now U.S. Pat. No. 8,840,693, issued Sep. 23, 2014. The subject matter of this application is related to the subject matter of provisional U.S. Patent Application Ser. No. 61/408,382, which was filed Oct. 29, 2010 and is titled "Graphene-Coated Diamond Particles, Polycrystalline Compacts, Drill Bits, and Compositions of Graphene-Coated Diamond Particles, and Methods of Forming Same," the disclosure of each of which is incorporated herein in its entirety by this reference. The subject matter of this application is also related to the subject matter of nonprovisional U.S. patent application Ser. No. 13/283,021, now U.S. Pat. No. 9,103,173, issued Aug. 11, 2015, which was filed Oct. 27, 2011, now U.S. Pat. No. 9,103,173, which issued Aug. 11, 2015, which claims the benefit of provisional U.S. Patent Application Ser. No. 61/408,382.

FIELD

Embodiments of the disclosure relate generally to coated particles, methods of forming coated particles, and methods of forming polycrystalline compacts from coated particles. Specifically, embodiments of the disclosure relate to particles of superhard material that have nanoparticles coated thereon.

BACKGROUND

Superhard materials have proven to be useful in a wide variety of applications. For example, cutting elements used in earth-boring tools often include a polycrystalline diamond (PCD) material, which may be used to form polycrystalline diamond cutters (often referred to as "PDCs"). Such polycrystalline diamond cutting elements are conventionally formed by sintering and bonding together relatively small diamond grains or crystals under conditions of high temperature and high pressure in the presence of a catalyst (e.g., cobalt, iron, nickel, or alloys and mixtures thereof) to form a layer of polycrystalline diamond material on a cutting element substrate. These processes are often referred to as high temperature/high pressure (or "HTHP") processes. The cutting element substrate may comprise a cermet material (i.e., a ceramic-metal composite material) comprising a plurality of particles of hard material in a metal matrix, such as, for example, cobalt-cemented tungsten carbide. In such instances, catalyst material in the cutting element substrate may be drawn into the diamond grains or crystals during sintering and catalyze formation of a diamond table from the diamond grains or crystals. In other methods, powdered catalyst material may be mixed with the diamond grains or crystals prior to sintering the grains or crystals together in an HTHP process.

Earth-boring tools for forming wellbores in subterranean earth formations that may include a plurality of cutting elements secured to a body include, for example, fixed-cutter earth-boring rotary drill bits (also referred to as "drag bits"). Such fixed-cutter bits include a plurality of cutting elements that are fixedly attached to a bit body of the drill bit, conventionally in pockets formed in blades and other exterior portions of the bit body. Other earth-boring tools may include rolling cone earth-boring drill bits, which include a plurality of cutters attached to bearing pins on legs depending from a bit body. The cutters may include cutting elements (sometimes called "teeth") milled or otherwise formed on the cutters, which may include hardfacing on the outer surfaces of the cutting elements, or the cutters may include cutting elements (sometimes called "inserts") attached to the cutters, conventionally in pockets formed in the cutters. Cutting elements that include superhard materials increase the useful life of the earth-boring tools to which they are attached because the superhard materials increase the strength and abrasion resistance of the tools.

Some superhard materials have desirable properties that render them useful in still other applications. For example, the high strength and abrasion resistance of such materials renders them useful in grinding, polishing, and machining applications. Increased thermal conductivity of some superhard materials renders them useful as particles dispersed in lubricants, such as motor and pump oils, because such lubricants often serve to cool the parts they lubricate. Furthermore, increased electrical conductivity of some superhard materials renders them useful as fillers in polymers and elastomers, where increased electrical conductivity in at least some portion of the polymers and elastomers is desirable.

Some attempts have been made to enhance or alter the properties of superhard materials through layering other materials thereon. For example, *Core-Shell Diamond as a Support for Solid-Phase Extraction and High-Performance Liquid Chromatigraphy*, 82 Analytical Chem. 4448 (Jun. 1, 2010), by Gaurav Saini, David S. Jensen, Landon A. Wiest, Michael A. Vail, Andrew Dadson, Milton L. Lee, V. Shuthanandan, and Matthew R. Linford discloses, among other things, layer-by-layer deposition of an amine-containing polymer and nanodiamond on an amine functionalized microdiamond.

BRIEF DESCRIPTION OF THE DRAWINGS

While the specification concludes with claims particularly pointing out and distinctly claiming that which is regarded as the present invention, various features and advantages of embodiments of the disclosure may be more readily ascertained from the following description of embodiments of the disclosure when read in conjunction with the accompanying drawings, in which:

DETAILED DESCRIPTION

The illustrations presented herein are not meant to be actual views of any particular particle, cutting element, or earth-boring tool, but are merely idealized representations that are employed to describe the embodiments of the disclosure. Thus, the drawings are not necessarily to scale and relative dimensions may have been exaggerated for the sake of clarity. Additionally, elements common between figures may retain the same or similar numerical designation.

Embodiments of the disclosure relate to particles of superhard material that have nanoparticles coated thereon. In some embodiments, a coating material comprising an amine terminated group may be successively interposed between the particles and/or the nanoparticles.

The terms "earth-boring tool" and "earth-boring drill bit," as used herein, mean and include any type of bit or tool used for drilling during the formation or enlargement of a wellbore in a subterranean formation and include, for example, fixed-cutter bits, rolling cone bits, impregnated bits, core bits, eccentric bits, bicenter bits, hybrid bits as well as reamers, mills, and other drilling bits and tools known in the art.

As used herein, the term "polycrystalline material" means and includes any structure comprising a plurality of grains (i.e., crystals) of material (e.g., superhard material) that are bonded directly together by inter-granular bonds. The crystal structures of the individual grains of the material may be randomly oriented in space within the polycrystalline material.

As used herein, the terms "inter-granular bond" and "interbonded" mean and include any direct atomic bond (e.g., covalent, metallic, etc.) between atoms in adjacent grains of superabrasive material.

As used herein, the term "superhard material" means and includes any material having a Knoop hardness value of about 3,000 Kg/mm$^2$ (29,420 MPa) or more. Superhard materials include, for example, diamond and cubic boron nitride. Superhard materials may also be characterized as "superabrasive" materials.

As used herein, the terms "nanoparticle" and "nanoscale" mean and include any particle, such as, for example, a crystal or grain, having an average particle diameter of between about 1 nm and 500 nm.

As used herein, the term "tungsten carbide" means any material composition that contains chemical compounds of tungsten and carbon, such as, for example, WC, W$_2$C, and combinations of WC and W$_2$C. Tungsten carbide includes, for example, cast tungsten carbide, sintered tungsten carbide, and macrocrystalline tungsten carbide.

Figure 1:
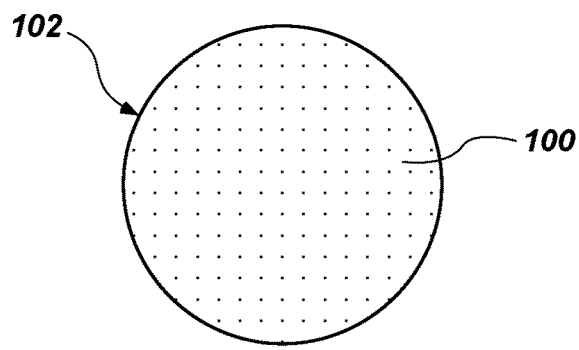
FIG. 1 is a cross-sectional view of a core particle.

Referring to FIG. 1, a cross-sectional view of a core particle 100 is shown. The core particle 100 is shown having a circular cross-section for the sake of simplicity, but core particles 100 in practice may have cross-sections of any shape, including irregular shapes. The core particle 100 may comprise a superhard material. For example, the core particle 100 may comprise synthetic diamond, natural diamond, cubic boron nitride, or any superhard material known in the art. Thus, the core particle 100 may comprise a single grain of diamond, for example. The core particle 100 may comprise an average diameter of between 1 μm and 500 μm. The core particle 100 may be provided as one of a plurality of similar core particles 100. Such a plurality of core particles 100 may be free of nanoscale particles.

An outer surface 102 of the core particle 100 may be modified by a surface treatment in some embodiments. For example, the outer surface 102 of the core particle 100 may be derivatized to exhibit a net negative charge or a net positive charge. Thus, a net charge may be imparted to the outer surface 102 of the core particle 100. Surface treatment may be accomplished using, for example, corona treatment, plasma treatment, chemical vapor treatment, wet etch, ashing, primer treatment (e.g., polymer-based or organosilane primer treatments), and other surface treatments known in the art.

Figure 2:
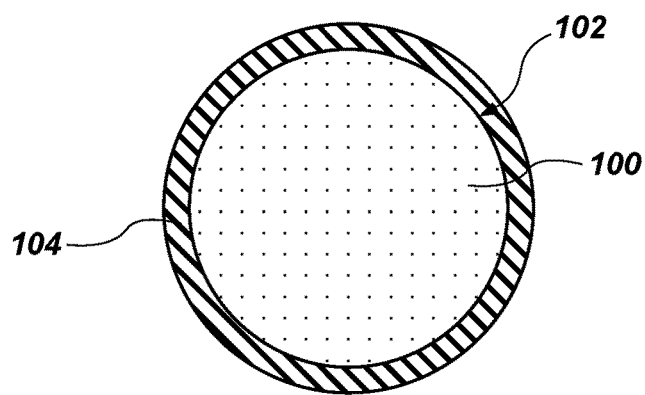
FIG. 2 depicts a cross-sectional view of the core particle of FIG. 1 after being coated with a coating material.

Referring to FIG. 2, a cross-sectional view of the core particle 100 of FIG. 1 after being coated with a coating material 104 is shown. Though the coating material 104 is shown as a coating of uniform thickness covering the entire outer surface 102 of the core particle 100, the coating material 104 may be of non-uniform thickness and may cover only a portion of the outer surface 102 of the core particle 100 in practice. The coating material 104 may carry a net charge opposite the net charge of the outer surface 102 of the core particle 100, which may facilitate adhesion of the coating material 104 to the outer surface 102 of the core particle 100, for example, by adsorption. The coating material 104 may comprise an amine terminated group. For example, the coating material 104 may comprise polyallylamine, polyethylenimine, polyethylenamine. As continuing examples, the coating material 104 may comprise a polyamine prepared by the polymerization of aziridene and including polyethylemeamines and polyethylenimines having a branched structure derived from aziridene and tris (aminoethyl)amine, a hyperbranched or dendrimeric polyamine such as polyamidoamine (PAMAM) dendrimer, a polyaminoacrylate such as poly(N,N-dimethylaminoethyl-(meth)acrylate), a copolymer thereof with an alkyl or aralkyl (meth)acrylate such as methyl (meth)acrylate, ethyl (meth) acrylate, 2-hydroxypropyl (meth)acrylate, (meth)acrylonitrile, poly(N,N-dimethylaminoethyl-(meth)acrylate)-co-(methyl(meth)acrylate), and combinations comprising at least one of these. As a specific example, the coating material 104 may comprise polyethylenimine, which carries a net positive charge and is water soluble.

The coating material 104 may be disposed on the outer surface 102 of the core particle 100 by any of several well-known processes. For example, the coating material 104 may be disposed on the outer surface 102 of the core particle 100 by wet chemistry processes (e.g., dip coating, solid-gel processing, etc.), physical deposition processes (e.g., sputtering, also known as physical vapor deposition (PVD), etc.), chemical deposition processes (e.g., chemical vapor deposition (CVD), atomic layer deposition (ALD), etc.), or combinations of these. As a specific example, a plurality of core particles 100 that have been surface treated using a corona treatment to impart a net negative charge to the outer surfaces 102 of particles of the plurality of core particles 100 may be disposed in an aqueous solution of polyallylamine, which carries a net positive charge, and the polyallylamine may adhere to the outer surfaces 102 of particles of the plurality of core particles 100.

Figure 3:
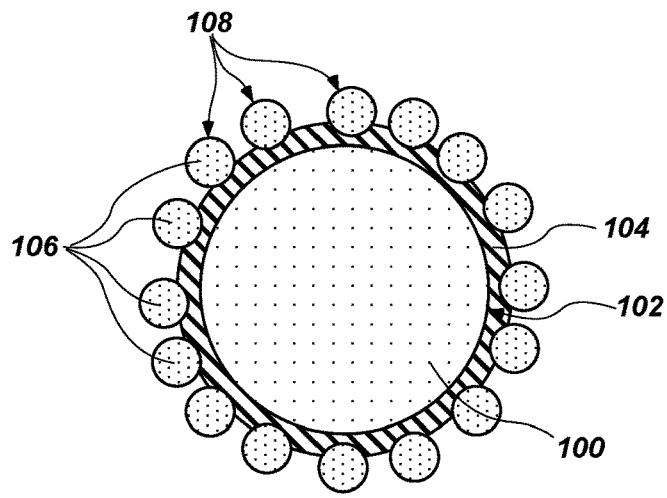
FIG. 3 illustrates a cross-sectional view of the coated core particle of FIG. 2 after nanoparticles have been disposed on the coating material.

Referring to FIG. 3, a cross-sectional view of the coated core particle 100 of FIG. 2 after a plurality of nanoparticles 106 has been disposed on the coating material 104 is shown. Though the plurality of nanoparticles 106 is depicted as having a circular cross-section for the sake of simplicity, the plurality of nanoparticles 106 may comprise any shape, and specifically may have irregular shapes, in practice. In addition, though the plurality of nanoparticles 106 is depicted as being disposed on the coating material 104 at fairly regular intervals over the entire coating material 104, the plurality of nanoparticles 106 may be disposed on the coating material 104 at irregular intervals and/or over only a portion of the coating material 104. The plurality of nanoparticles 106 may comprise, for example, surface modified nanodiamonds, oxidized nanodiamonds, carbon nanotubes, nanographite, nanographene, other nanoscale non-diamond allotropes of carbon (e.g., amorphous carbon, fullerenes, carbon nanobuds, Lonsdaleite, etc.), nanoscale particles of BeO, and nanoscale particles comprising a Group VIIIA element (e.g., iron, cobalt, nickel, etc.), known in the art as catalyst materials. Thus, the material of the plurality of nanoparticles 106 may be the same as the material of the core particle 100 in some embodiments. In other embodiments, the plurality of nanoparticles 106 may comprise a different material from the material of the core particle 100. In some embodiments, the plurality of nanoparticles 106 may comprise at least some nanoparticles 106 of one material (e.g., graphite), and at least some other nanoparticles 106 of another material (e.g., a Group VIIIA element catalyst material).

Prior to being deposited onto the coating material 104, the plurality of nanoparticles 106 may be modified by a surface treatment in some embodiments. For example, an outer surface 108 of the plurality of nanoparticles 106 may be derivatized to exhibit a net charge opposite a net charge of the coating material 104, which may be a net negative charge or a net positive charge. Surface treatment may be accomplished using, for example, any of the surface treatments described previously in connection with the core particle 100 and other surface treatments known in the art. By alternating the net charge carried by the successive components of the coated core particle 100, each successive component (e.g., the core particle 100, the coating material 104, and the plurality of nanoparticles 106) may be adhered to its adjacent components using non-covalent intermolecular interactions (e.g., van der Waals forces) and mechanical interference.

The plurality of nanoparticles 106 may be disposed on the coating material 104 by, for example, dispersing the plurality of nanoparticles 106 in a continuous phase material to form a dispersion. The resulting dispersion may be, for example, a suspension, a colloid, or a solution, depending on the type of continuous phase material used and the material of the plurality of nanoparticles 106. As a specific example, the plurality of nanoparticles 106 may comprise carbon nanotubes suspended in water. The plurality of nanoparticles 106 shown disposed on the coating material 104 in FIG. 3 may represent only a small proportion of an overall plurality of nanoparticles 106 in the dispersion to ensure that a sufficient quantity of nanoparticles 106 is present for adhering to the coating material 104. A plurality of core particles 100 at least partially coated with the coating material 104 may then be exposed to the dispersed plurality of nanoparticles 106 by disposing the plurality of coated core particles 100 in the dispersion. In some embodiments, the dispersion may then be agitated to circulate the plurality of coated core particles 100 and the plurality of nanoparticles 106 and increase the likelihood that at least some of the plurality of nanoparticles 106 may adhere to the coating material 104 disposed on the coated core particles 100. As a result, at least some nanoparticles of the plurality of nanoparticles 106 may be disposed on and adhered to the coating material 104, which is disposed on and adhered to the plurality of core particles 100.

The plurality of nanoparticles 106 may impart desirable characteristics to the core particle 100. Where the core particle 100 comprises diamond and the plurality of nanoparticles 106 comprises nanographite, for example, the plurality of nanoparticles 106 may increase the ability to lubricate, increase the electrical insulation, and increase the thermal insulation of the resulting coated core particle 100 as compared to the core particle 100 without any nanoparticles 106 coated thereon. Such a combination of characteristics may be desirable in, for example, a lubricant in which the coated core particles 100 may be dispersed. Thus, the core particles 100, the coating materials 104, and the nanoparticles 106 used will depend on the application for which they are intended and the properties of each. In some embodiments, a single application of coating material 104 and nanoparticles 106 may be sufficient. In other embodiments, the coated core particle 100 may undergo subsequent processing.

Figure 4:
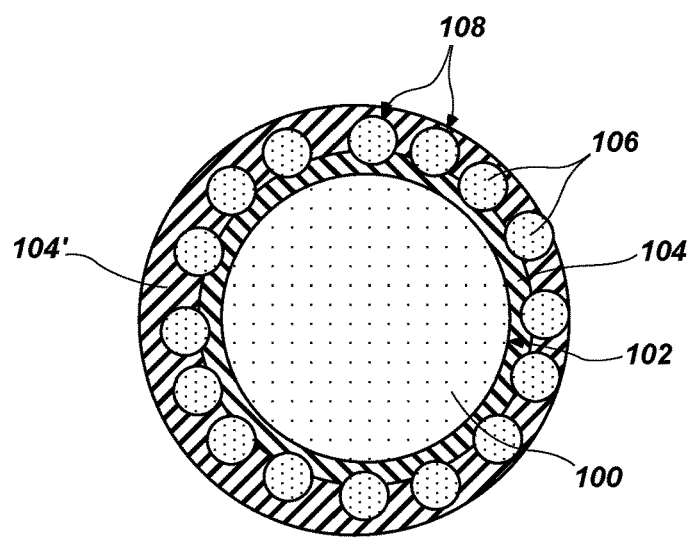
FIG. 4 is a cross-sectional view of the coated core particle of FIG. 3 after coating the nanoparticles with another coating.

Referring to FIG. 4, a cross-sectional view of the coated core particle 100 of FIG. 3 is shown after the plurality of nanoparticles 106 has been coated with a second coating material 104'. Though the second coating material 104' is shown as a coating of uniform thickness covering the entire exposed outer surface 108 of the plurality of nanoparticles 106 and the underlying coating material 104, the second coating material 104' may be of non-uniform thickness and may cover only a portion of the exposed outer surfaces of components (e.g., the underlying coating material 104 and the plurality of nanoparticles 106) of the coated core particle 100 in practice. The second coating material 104' may carry a net charge opposite the net charge of the outer surface 108 of the plurality of nanoparticles 106, which may facilitate adhesion of the second coating material 104' to the outer surface 108 of the plurality of nanoparticles 106, for example, by adsorption. The second coating material 104' may comprise an amine terminated group, such as, for example, any of the amine terminated group materials described previously in connection with the underlying coating material 104. The second coating material 104' may comprise the same material as the underlying coating material 104 in some embodiments. In other embodiments, the second coating material 104' may comprise a different material from the underlying coating material 104.

The second coating material 104' may be disposed on the coated core particle 100 by any of several well-known processes. For example, the second coating material 104' may be disposed on the coated core particle 100 by any of the processes described previously in connection with the underlying coating material 104. As a specific example, a plurality of coated core particles 100 having a coating material 104 interposed between and adhered to each core particle 100 and a plurality of nanoparticles 106 that have been surface treated using a corona treatment to impart a net negative charge to the outer surface 108 of the plurality of nanoparticles 106 may be disposed in an aqueous solution of polyallylamine, which carries a net positive charge, and the polyallylamine may thereby be disposed on and adhered to the outer surface 108 of the plurality of nanoparticles 106.

Figure 5:
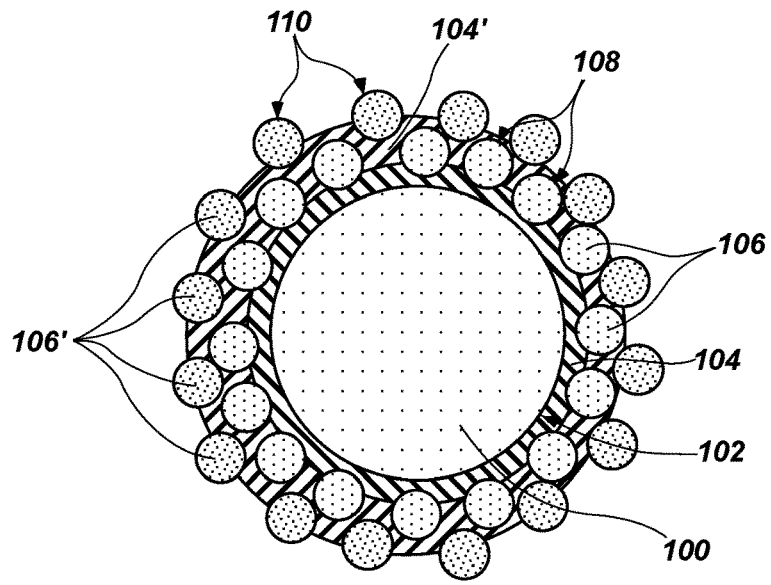
FIG. 5 depicts a cross-sectional view of the coated core particle of FIG. 4 after other nanoparticles have been disposed on the other coating.

Referring to FIG. 5, a cross-sectional view of the coated core particle 100 of FIG. 4 is shown after a second plurality of nanoparticles 106' has been disposed on the second coating material 104'. Though the second plurality of nanoparticles 106' is depicted as having a circular cross-section for the sake of simplicity, the second plurality of nanoparticles 106' may comprise any shape, and specifically may have irregular shapes, in practice. In addition, though the second plurality of nanoparticles 106' is depicted as being disposed on the second coating material 104' at fairly regular intervals over the entire second coating material 104', the second plurality of nanoparticles 106' may be disposed on the second coating material 104' at irregular intervals over only a portion of the second coating material 104'. The second plurality of nanoparticles 106' may comprise any of the materials described previously in connection with the first plurality of nanoparticles 106. Thus, the material of the second plurality of nanoparticles 106' may be the same as the material of the core particle 100 and the material of the first plurality of nanoparticles 106 in some embodiments. In other embodiments, the second plurality of nanoparticles 106' may comprise a different material from one or both of the materials of the core particle 100 and the first plurality of nanoparticles 106. In some embodiments, the second plurality of nanoparticles 106' may comprise at least some nanoparticles 106' of one material (e.g., graphite), and at least some other nanoparticles 106' of another material (e.g., a Group VIIIA element catalyst material). As a specific, non-limiting example, the core particle 100 shown in FIG. 5 may comprise a diamond crystal, the first plurality of nanoparticles 106 may comprise nanographite, and the second plurality of nanoparticles 106' may comprise nanographene.

Prior to being deposited onto the second coating material 104', the second plurality of nanoparticles 106' may be modified by a surface treatment in some embodiments. For example, an outer surface 110 of the second plurality of nanoparticles 106' may be derivatized to exhibit a net charge opposite a net charge of the second coating material 104', which may be a net negative charge or a net positive charge. Surface treatment may be accomplished using, for example, any of the surface treatments described previously in connection with the core particle 100 and other surface treatments known in the art. By alternating the net charge carried by the successive components of the coated core particle 100, each successive component (e.g., the core particle 100, the first coating material 104, the first plurality of nanoparticles 106, the second coating material 104', and the second plurality of nanoparticles 106') may be adhered to its adjacent components.

The second plurality of nanoparticles 106' may be disposed on the second coating material 104' by, for example, dispersing the second plurality of nanoparticles 106' in a continuous phase material to form a dispersion. The resulting dispersion may be, for example, a suspension, a colloid, or a solution, depending on the type of continuous phase material used and the material of the second plurality of nanoparticles 106'. As a specific example, the second plurality of nanoparticles 106' may comprise nanoscale particles of cobalt suspended in water. The second plurality of nanoparticles 106' shown disposed on the second coating material 104' in FIG. 5 may represent only a small proportion of an overall second plurality of nanoparticles 106' in the dispersion to ensure that a sufficient quantity of nanoparticles 106' is present for adhering to the second coating material 104'. A plurality of coated core particles 100, such as that shown in FIG. 4, may then be exposed to the dispersed second plurality of nanoparticles 106' by disposing the plurality of coated core particles 100 in the dispersion. In some embodiments, the dispersion may then be agitated to circulate the plurality of coated core particles 100 and the second plurality of nanoparticles 106' and increase the likelihood that at least some of the second plurality of nanoparticles 106' may adhere to the second coating material 104' disposed on the coated core particles 100. As a result, at least some of the second plurality of nanoparticles 106' may be disposed on and adhered to the second coating material 104'.

Figure 6:
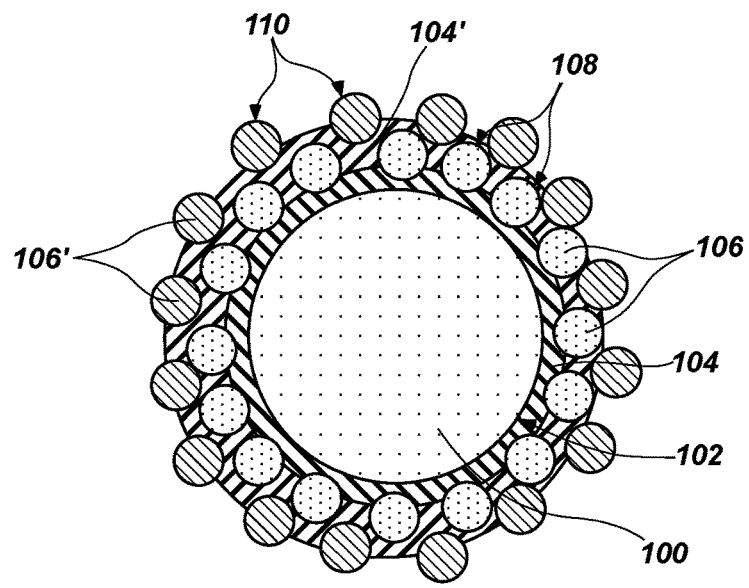
FIG. 6 illustrates a cross-sectional view of an alternative embodiment of the nanoparticles shown in FIG. 5.

Referring to FIG. 6, a cross-sectional view of an alternative embodiment of the second plurality of nanoparticles 106' of FIG. 5 is shown. Specifically, the core particle 100 shown in FIG. 6 may comprise a diamond crystal, the first plurality of nanoparticles 106 may comprise nanographite, and the second plurality of nanoparticles 106' may comprise nanoscale particles of cobalt. Such a coated particle may be used as a precursor in a process for making a polycrystalline diamond material of a PDC cutting element. By locating nanoparticles comprising carbon allotropes and catalyst material proximate one another and proximate a larger core diamond particle, such a coated core particle 100 may facilitate the in situ nucleation of diamond grains. For example, the catalyst material of the coated core particle 100 may more easily access and catalyze in situ nucleation of diamond grains from the nanographite particles because the catalyst material does not have to flow, as from a cobalt-cemented carbide substrate, through the often tortuous path to the presence of the nanographite. U.S. Application Publication No. 2011/0031034, published Feb. 10, 2011, now U.S. Pat. No. 8,579,052, issued Nov. 12, 2013, the disclosure of which is incorporated by reference herein in its entirety, discloses that in situ nucleation of diamond grains may result in a stronger and more abrasion resistant polycrystalline diamond material.

Figure 7:
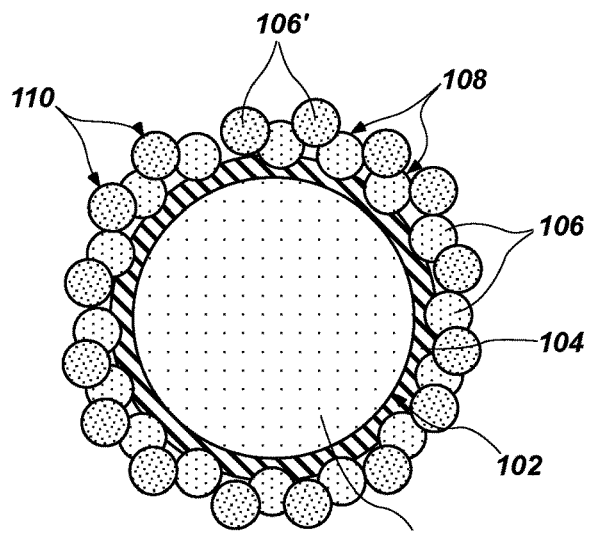
FIG. 7 is a cross-sectional view of another embodiment of the coated core particle shown in FIG. 5 wherein the other nanoparticles are disposed directly on the first nanoparticles.

Referring to FIG. 7, a cross-sectional view of another alternative embodiment of the coated core particle 100 shown in FIG. 5 is shown. In this embodiment, the second plurality of nanoparticles 106' is adhered directly to the first plurality of nanoparticles 106. To facilitate adhesion, the second plurality of nanoparticles 106' may be modified by a surface treatment. For example, the outer surface 110 of the second plurality of nanoparticles 106' may be derivatized to exhibit a net charge opposite a net charge of the outer surface 108 of the first plurality of nanoparticles 106, which may be a net negative charge or a net positive charge. Surface treatment may be accomplished using, for example, any of the surface treatments described previously in connection with the core particle 100 and other surface treatments known in the art. In embodiments where particles are adhered directly to one another, coating materials, such as, for example, the second coating material 104' shown in FIGS. 5 and 6 may be omitted. Thus, any of the coating materials 104 and 104' described previously and any of those described subsequently herein may optionally be omitted where alternating net charge carried by the outer surface or other factors permit adjacent particles to be directly adhered to one another.

Figure 8:
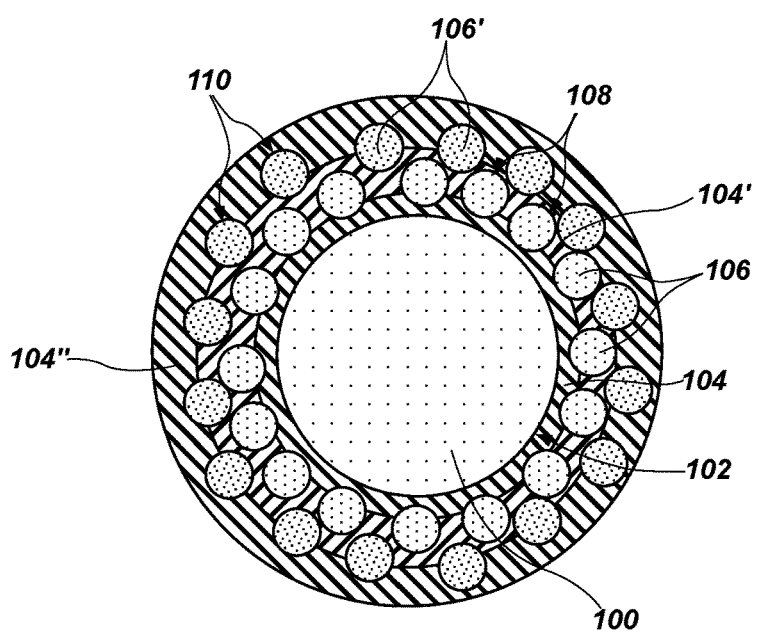
FIG. 8 depicts a cross-sectional view of the coated core particle of FIG. 5 after coating the other nanoparticles with yet another coating.

Referring to FIG. 8, a cross-sectional view of the coated core particle 100 of FIG. 5 after coating the second plurality of nanoparticles 106' with a third coating material 104" is shown. Though the third coating material 104" is shown as a coating of uniform thickness covering the entire exposed outer surface 110 of the second plurality of nanoparticles 106' and the underlying second coating material 104', the third coating material 104" may be of non-uniform thickness and may cover only a portion of the exposed outer surfaces of components (e.g., the underlying second coating material 104' and the second plurality of nanoparticles 106') of the coated core particle 100 in practice. The third coating material 104" may carry a net charge opposite the net charge of the outer surface 110 of the second plurality of nanoparticles 106', which may facilitate adhesion of the third coating material 104" to the outer surface 110 of the second plurality of nanoparticles 106', for example, by adsorption. The third coating material 104" may comprise an amine terminated group, such as, for example, any of the amine terminated group materials described previously in connection with the first coating material 104. The third coating material 104" may comprise the same material as the first coating material 104 and the second coating material 104' in some embodiments. In other embodiments, the third coating material 104" may comprise a different material from at least one of the first coating material 104 and the second coating material 104'.

The third coating material 104" may be disposed on the coated core particle 100 by any of several well-known processes. For example, the third coating material 104" may be disposed on the coated core particle 100 by any of the processes described previously in connection with the first coating material 104. As a specific example, a plurality of coated core particles 100 having adhered thereto an outer second plurality of nanoparticles 106' that have been surface treated using a corona treatment to impart a net negative charge to the outer surface 110 of the second plurality of nanoparticles 106' may be disposed in an aqueous solution of polyallylamine, which carries a net positive charge, and the polyallylamine may thereby be disposed on and adhered to the outer surface 110 of the second plurality of nanoparticles 106'.

Figure 9:
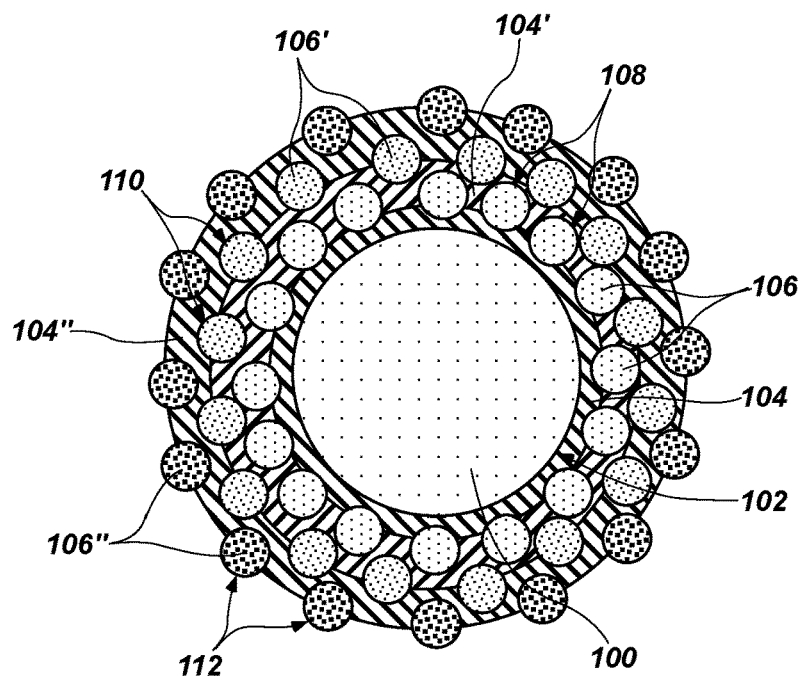
FIG. 9 illustrates a cross-sectional view of the coated core particle of FIG. 8 after still other nanoparticles have been disposed on the yet other coating.

Referring to FIG. 9, a cross-sectional view of the coated core particle 100 of FIG. 8 is shown after a third plurality of nanoparticles 106" has been disposed on the third coating material 104". Though the third plurality of nanoparticles 106" is depicted as having a circular cross-section for the sake of simplicity, the third plurality of nanoparticles 106" may comprise any shape, and specifically may have irregular shapes, in practice. In addition, though the third plurality of nanoparticles 106" is depicted as being disposed on the third coating material 104" at fairly regular intervals over the entire third coating material 104", the third plurality of nanoparticles 106" may be disposed on the third coating material 104" at irregular intervals over only a portion of the third coating material 104". The third plurality of nanoparticles 106" may comprise any of the materials described previously in connection with the first plurality of nanoparticles 106. Thus, the material of the third plurality of nanoparticles 106" may be the same as the material of the core particle 100, the material of the first plurality of nanoparticles 106, and the material of the second plurality of nanoparticles 106' in some embodiments. In other embodiments, the third plurality of nanoparticles 106" may comprise a different material from one, some, or all of the materials of the core particle 100, the first plurality of nanoparticles 106, and the second plurality of nanoparticles 106'. In some embodiments, the third plurality of nanoparticles 106" may comprise at least some nanoparticles 106" of one material (e.g., graphite), and at least some other nanoparticles 106" of another material (e.g., a Group VIIIA element catalyst material). As a specific non-limiting example, the core particle 100 shown in FIG. 9 may comprise a diamond crystal, the first plurality of nanoparticles 106 may comprise nanographite, the second plurality of nanoparticles 106' may comprise nanographene, and the third plurality of particles 106" may comprise carbon nanotubes.

Prior to being deposited onto the third coating material 104", the third plurality of nanoparticles 106" may be modified by a surface treatment in some embodiments. For example, an outer surface 112 of the third plurality of nanoparticles 106" may be derivatized to exhibit a net charge opposite a net charge of the third coating material 104", which may be a net negative charge or a net positive charge. Surface treatment may be accomplished using, for example, any of the surface treatments described previously in connection with the core particle 100 and other surface treatments known in the art. By alternating the net charge carried by the successive components of the coated core particle 100, each successive component (e.g., the core particle 100, the first coating material 104, the first plurality of nanoparticles 106, the second coating material 104', the second plurality of nanoparticles 106', the third coating material 104", and the third plurality of particles 106") may be adhered to its adjacent components.

The third plurality of nanoparticles 106" may be disposed on the third coating material 104" by, for example, dispersing the third plurality of nanoparticles 106" in a continuous phase material to form a dispersion. The resulting dispersion may be, for example, a suspension, a colloid, or a solution, depending on the type of continuous phase material used and the material of the third plurality of nanoparticles 106". As a specific example, the third plurality of nanoparticles 106" may comprise nanoscale particles of BeO suspended in water. The third plurality of nanoparticles 106" shown disposed on the third coating material 104" in FIG. 9 may represent only a small proportion of an overall third plurality of nanoparticles 106" in the dispersion to ensure that a sufficient quantity of nanoparticles 106" is present for adhering to the third coating material 104". A plurality of coated core particles 100, such as coated core particle 100 shown in FIG. 8, may then be exposed to the dispersed third plurality of nanoparticles 106" by disposing the plurality of coated core particles 100 in the dispersion. In some embodiments, the dispersion may then be agitated to circulate the plurality of coated core particles 100 and the third plurality of nanoparticles 106" and increase the likelihood that at least some of the third plurality of nanoparticles 106" may adhere to the third coating material 104" disposed on the plurality of coated core particles 100. As a result, at least some of the third plurality of nanoparticles 106" may be disposed on and adhered to the third coating material 104".

Figure 10:
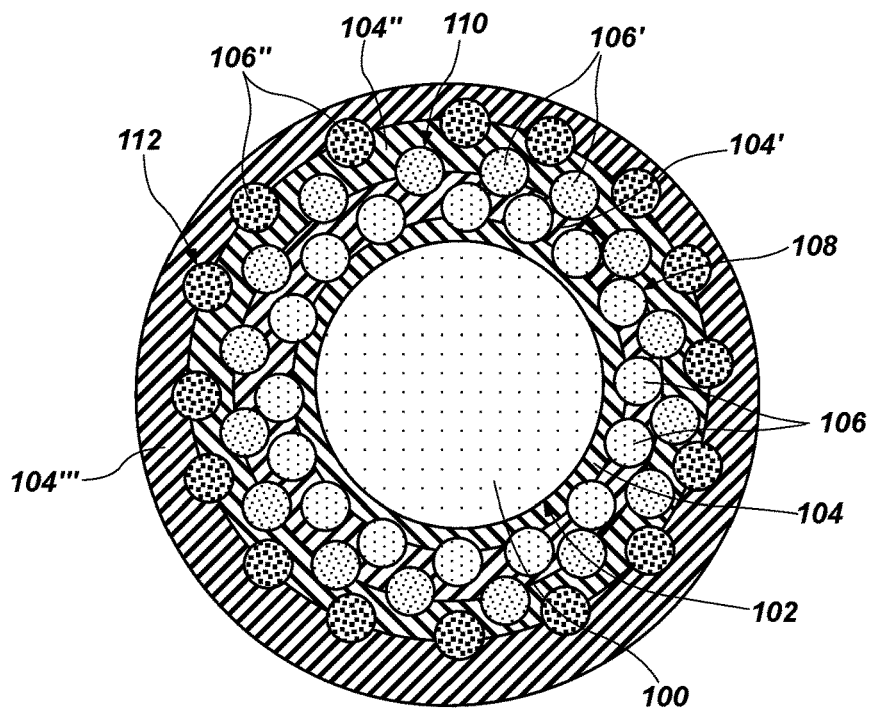
FIG. 10 is a cross-sectional view of the coated core particle of FIG. 9 after coating the still other nanoparticles have been coated in a final coating.

Referring to FIG. 10, a cross-sectional view of the coated core particle 100 of FIG. 9 after coating the third plurality of nanoparticles 106" with a fourth coating material 104''' is shown. Though the fourth coating material 104''' is shown as a coating of uniform thickness covering the entire exposed outer surface 112 of the third plurality of nanoparticles 106" and the underlying third coating material 104", the fourth coating material 104''' may be of non-uniform thickness and may cover only a portion of the exposed outer surfaces of components (e.g., the underlying third coating material 104" and the third plurality of nanoparticles 106") of the coated core particle 100 in practice. The fourth coating material 104''' may carry a net charge opposite the net charge of the outer surface 112 of the third plurality of nanoparticles 106", which may facilitate adhesion of the fourth coating material 104''' to the outer surface 112 of the third plurality of nanoparticles 106'', for example, by adsorption. The fourth coating material 104''' may comprise an amine terminated group, such as, for example, any of the amine terminated group materials described previously in connection with the first coating material 104. The fourth coating material 104''' may comprise the same material as the first coating material 104, the second coating material 104', and the third coating material 104'' in some embodiments. In other embodiments, the third coating material 104'' may comprise a different material from at least one of the first coating material 104, the second coating material 104', and the third coating material 104''.

The fourth coating material 104''' may be disposed on the coated core particle 100 by any of several well-known processes. For example, the fourth coating material 104''' may be disposed on the coated core particle 100 by any of the processes described previously in connection with the first coating material 104. As a specific example, a plurality of coated core particles 100 having adhered thereto an outer third plurality of nanoparticles 106'' that has been surface treated using a corona treatment to impart a net negative charge to the outer surface 112 of the third plurality of nanoparticles 106'' may be disposed in an aqueous solution of polyallylamine, which carries a net positive charge, and the polyallylamine may thereby be disposed on and adhered to the outer surface 112 of the third plurality of nanoparticles 106''.

Successive deposition of pluralities of nanoparticles and coating materials, a process known in the art as layer-by-layer or "LbL" deposition, may continue for as many times as desired or practicable. For example, fourth, fifth, sixth, seventh, etc., pluralities of nanoparticles may be disposed on fourth, fifth, sixth, seventh, etc., coating materials. Such subsequent deposition of pluralities of nanoparticles and coating materials may comprise materials and may be accomplished using processes such as those described previously in connection with the first plurality of nanoparticles 106 and the first coating material 104 (FIG. 3).

After a desired number of iterations of deposition of coating materials and pluralities of nanoparticles has occurred, the coating materials may be cross-linked. Cross-linking the coating materials may enhance the mechanical strength and stability of the coating materials. Cross-linking may be accomplished using, for example, addition of a cross-linking reagent, ultraviolet radiation, electron beam radiation, heat, or other processes for cross-linking known in the art.

Figure 11:
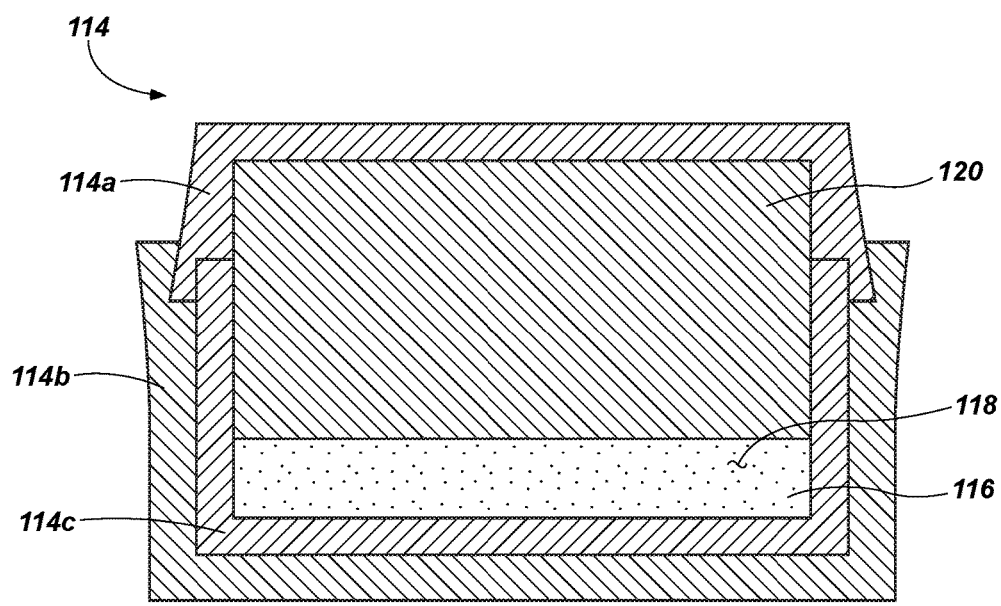
FIG. 11 depicts a cross-sectional view of a mold that may be used to form a cutting element.

FIG. 11 depicts a cross-sectional view of a mold 114 that may be used to form a cutting element. The mold 114 may include one or more generally cup-shaped members, such as a cup-shaped member 114a, a cup-shaped member 114b, and a cup-shaped member 114c, which may be assembled and swaged and/or welded together to form the mold 114. A plurality of particles 116 comprising a superhard material may be disposed within the inner cup-shaped member 114c, as shown in FIG. 11, which has a circular end wall and a generally cylindrical lateral side wall extending perpendicularly from the circular end wall, such that the inner cup-shaped member 114c is generally cylindrical and includes a first closed end and a second, opposite open end.

The plurality of particles 116 may comprise at least one coated particle, such as any of those shown in FIGS. 3 through 10. In some embodiments, each particle of the plurality of particles 116 may comprise a coated particle similar to the other coated particles of the plurality of coated particles. In other embodiments, at least some of the particles may comprise coated particles with a different number of coatings and/or a different combination of materials than others of the particles of the plurality of particles 116. In still other embodiments, coated particles, such as any of those shown in FIGS. 3 through 10, may be intermixed with or interlayered with uncoated particles, such as that shown in FIG. 1, within the plurality of particles 116. In some embodiments, an optional catalyst material 118 in the form of a powder may be interspersed among the plurality of particles 116 comprising a superhard material. The plurality of particles 116 may comprise a mono-modal or a multi-modal grain size distribution.

A substrate 120 comprising a hard material suitable for use in earth-boring applications may be disposed adjacent the plurality of particles 116 in the mold 114. The hard material of the substrate 120 may comprise, for example, a ceramic-metal composite material (i.e., a "cermet" material) comprising a plurality of hard ceramic particles dispersed throughout a metal matrix material. The hard ceramic particles may comprise carbides, nitrides, oxides, and borides (including boron carbide ($B_4C$)). More specifically, the hard ceramic particles may comprise carbides and borides made from elements such as W, Ti, Mo, Nb, V, Hf, Ta, Cr, Zr, Al, and Si. By way of example and not limitation, materials that may be used to form hard ceramic particles include tungsten carbide, titanium carbide (TiC), tantalum carbide (TaC), titanium diboride ($TiB_2$), chromium carbides, titanium nitride (TiN), aluminum oxide ($Al_2O_3$), aluminum nitride (AlN), and silicon carbide (SiC). The metal matrix material of the ceramic-metal composite material may include, for example, cobalt-based, iron-based, nickel-based, iron- and nickel-based, cobalt- and nickel-based, and iron- and cobalt-based alloys. The matrix material may also be selected from commercially pure elements such as cobalt, iron, and nickel. As a specific, non-limiting example, the hard material may comprise a plurality of tungsten carbide particles in a cobalt matrix, known in the art as cobalt-cemented tungsten carbide.

The plurality of particles 116, the optional catalyst material 118, and the substrate 120 may then be subjected to a high temperature/high pressure (HTHP) process. Although the exact operating parameters of HTHP processes will vary depending on the particular compositions and quantities of the various materials being sintered, the pressures in the heated press may be greater than about 5.0 GPa and the temperatures may be greater than about 1,400° C. The pressures in the heated press may be greater than about 6.5 GPa (e.g., about 6.7 GPa), and may even exceed 8.0 GPa in some embodiments. Furthermore, the materials being sintered may be held at such temperatures and pressures for a time period between about 30 seconds and about 20 minutes. If necessary or desirable, the temperature may be reduced to about 1,000° C. and held for up to about one hour, or more to assist in the in situ nucleation of grains of superhard material. Additionally, the temperature may be reduced and maintained at a temperature between about 400° C. and about 800° C. for at least about 30 minutes (e.g., up to about 24 hours or more) in a process similar to those known in the art of metallurgy as "re-crystallization annealing" process.

Figure 12:
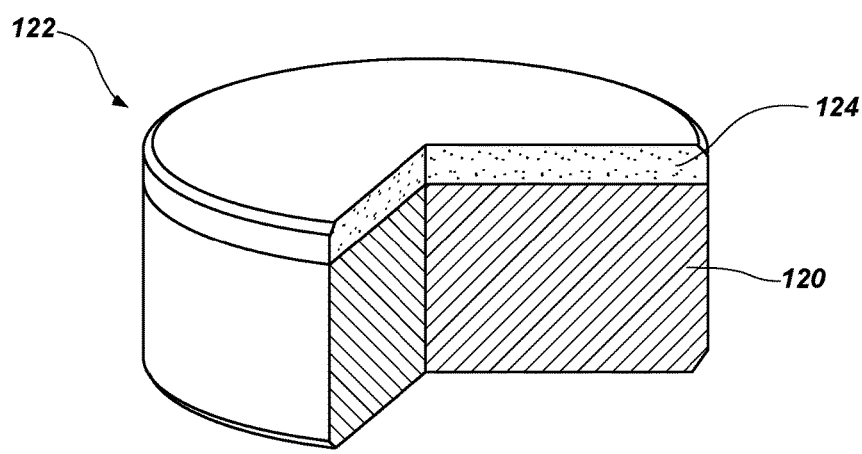
FIG. 12 illustrates a partial cutaway perspective view of a cutting element that may be attached to an earth-boring tool.

Referring to FIG. 12, a partial cutaway perspective view of a cutting element 122 formed by an HTHP process is shown. The cutting element 122 includes a polycrystalline table 124 attached to an end of a substrate 120. The polycrystalline table 124 comprises a polycrystalline superhard material, such as, for example, polycrystalline diamond. Though the cutting element 122 is depicted as having a cylindrical shape, coated core particles, such as any of those shown in FIGS. 3 through 10, may be used to form polycrystalline tables 124 having any shape, such as, for example, dome-shaped, conic, tombstone, and other shapes for superhard polycrystalline materials known in the art.

Figure 13:
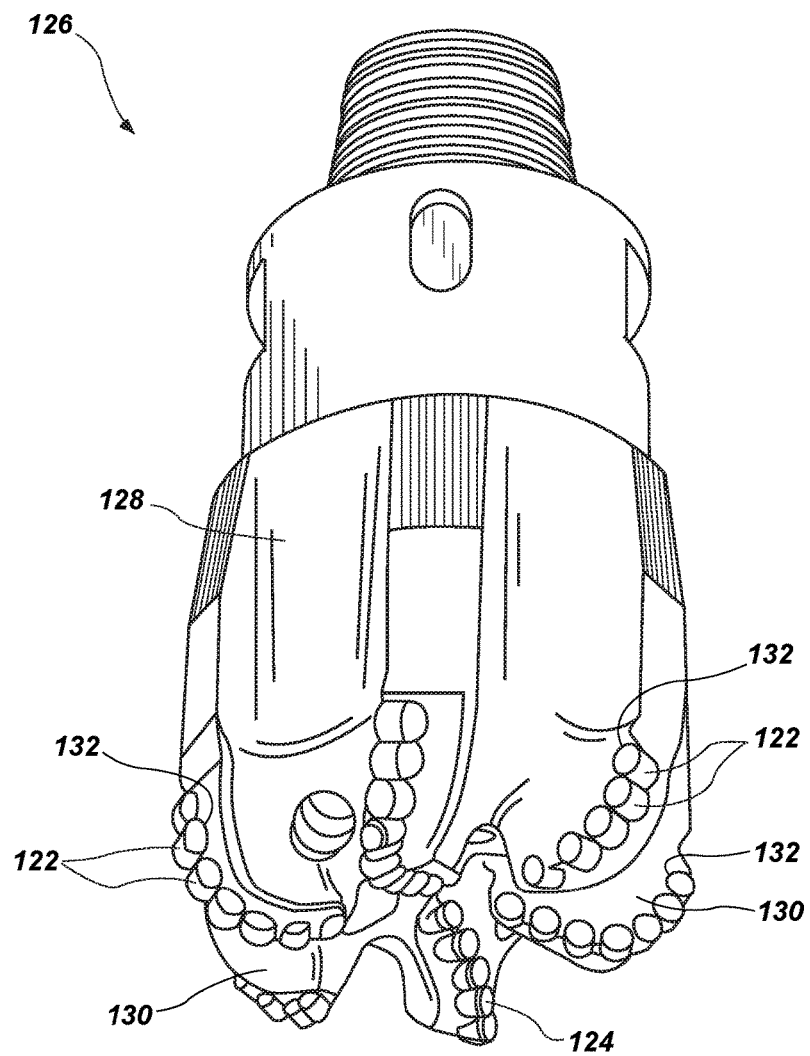
FIG. 13 is a perspective view of an earth-boring tool to which cutting elements may be attached.

Referring to FIG. 13, a perspective view of an earth-boring tool 126 to which cutting elements 122 may be attached is shown. The earth-boring tool 126 includes a bit body 128 having blades 130 extending from the bit body 128. The cutting elements 122 may be secured within pockets 132 formed in the blades 130. However, cutting elements 122 and polycrystalline tables 124 as described herein may be bonded to and used on other types of earth-boring tools, including, for example, roller cone drill bits, percussion bits, impregnated bits, core bits, eccentric bits, bicenter bits, reamers, expandable reamers, mills, hybrid bits, and other drilling bits and tools known in the art.

While the present invention has been described herein with respect to certain embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

CONCLUSION

In some embodiments, coated particles comprise a core particle comprising a superhard material and having an average diameter of between 1 μm and 500 μm. A coating material is adhered to and covers at least a portion of an outer surface of the core particle, the coating material comprising an amine terminated group. A plurality of nanoparticles selected from the group consisting of carbon nanotubes, nanographite, nanographene, non-diamond carbon allotropes, surface modified nanodiamond, nanoscale particles of BeO, and nanoscale particles comprising a Group VIIIA element is adhered to the coating material.

In other embodiments, methods of coating a particle comprise at least partially coating a core particle comprising a superhard material and having an average diameter of between 1 μm and 500 μm with a coating material comprising an amine terminated group. The coating material adheres to an outer surface of the core particle. The at least partially coated core particle is disposed in a dispersion comprising a plurality of nanoparticles comprising a material selected from the group consisting of graphite, graphene, a non-diamond allotrope of carbon, surface modified diamond, BeO, and a Group VIIIA element dispersed in a continuous phase material. At least some nanoparticles of the plurality of nanoparticles adhere to the coating material.

In additional embodiments, methods of forming a polycrystalline compact comprise at least partially coating a plurality of core particles comprising a superhard material and having an average particle size of between 1 μm and 500 μm with a coating material comprising an amine terminated group. The coating material adheres to an outer surface of the plurality of core particles. The at least partially coated plurality of core particles is disposed in a dispersion comprising a plurality of nanoparticles comprising a material selected from the group consisting of graphite, graphene, a non-diamond allotrope of carbon, surface modified diamond, BeO, and a Group VIIIA element dispersed in a continuous phase material. At least some nanoparticles of the plurality of nanoparticles adhere to the coating material. At least some of the at least partially coated plurality of core particles are interbonded by subjecting them to a high temperature/high pressure process to form a polycrystalline material.

What is claimed is:

1. A method of making a cutting element for an earth-boring tool, comprising:
   placing a powdered mixture into a mold, the powdered mixture comprising:
      a plurality of core particles comprising a diamond material and having an average diameter of between 1 μm and 500 μm;
      a coating material adhered to and covering at least a portion of an outer surface of each core particle of the plurality of core particles, the coating material comprising an amine terminated group; and
      a plurality of nanoparticles selected from the group consisting of carbon nanotubes, nanographite, nanographene, non-diamond carbon allotropes, surface modified nanodiamond, nanoscale particles of BeO, and nanoscale particles comprising a Group VIIIA element adhered to the coating material;
   sintering the powdered mixture to form a polycrystalline diamond table; and
   attaching the polycrystalline diamond table to a substrate.

2. The method of claim 1, further comprising imparting a first net charge to the outer surface of each core particle of the plurality of core particles, imparting a second net charge opposite the first net charge to the coating material, and imparting a third net charge opposite the second net charge to an outer surface of at least some nanoparticles of the plurality of nanoparticles before placing the powdered mixture into the mold.

3. The method of claim 1, further comprising adhering at least a second coating material to at least a portion of the plurality of nanoparticles before placing the powdered mixture into the mold.

4. The method of claim 3, further comprising adhering at least a second plurality of nanoparticles selected from the group consisting of carbon nanotubes, nanographite, nanographene, non-diamond carbon allotropes, surface modified nanodiamond, nanoscale particles of BeO, and nanoscale particles comprising a Group VIIIA element to the at least a second coating material before placing the powdered mixture into the mold.

5. The method of claim 4, wherein adhering the at least a second plurality of nanoparticles to the at least a second coating material comprises adhering the at least a second plurality of nanoparticles comprising a material different from the material of the plurality of nanoparticles to the at least a second coating material before placing the powdered mixture into the mold.

6. The method of claim 4, further comprising imparting to each core particle, the coating material, the plurality of nanoparticles, the at least a second coating material, and the at least a second plurality of nanoparticles a net charge opposite a net charge of its adjacent components before placing the powdered mixture into the mold.

7. The method of claim 4, further comprising adhering a plurality of other coating materials and other pluralities of nanoparticles successively disposed on one another to one another before placing the powdered mixture into the mold.

8. The method of claim 1, wherein placing the powdered mixture comprising the coating material into the mold comprises placing the powdered mixture comprising the coating material of at least one of polyallylamine and branched polyethylenimine into the mold.

9. A method of making an earth-boring tool, comprising: securing a cutting element to a body, the cutting element comprising:
- a substrate; and
- a polycrystalline diamond table secured to the substrate, at least a portion of the polycrystalline diamond table being formed from:
  - a plurality of core particles comprising a diamond material and having an average diameter of between 1 µm and 500 µm;
  - a coating material adhered to and covering at least a portion of an outer surface of each core particle of the plurality of core particles, the coating material comprising an amine terminated group; and
  - a plurality of nanoparticles selected from the group consisting of carbon nanotubes, nanographite, nanographene, non-diamond carbon allotropes, surface modified nanodiamond, nanoscale particles of BeO, and nanoscale particles comprising a Group VIIIA element adhered to the coating material.

10. A method of making a polycrystalline diamond table for a cutting element of an earth-boring tool, comprising:
- at least partially coating a plurality of core particles comprising a diamond material and having an average particle size of between 1 µm and 500 µm with a coating material comprising an amine terminated group;
- adhering the coating material to outer surfaces of core particles of the plurality of core particles;
- positioning the at least partially coated plurality of core particles in a dispersion comprising a plurality of nanoparticles, at least a portion of the plurality of nanoparticles comprising a material selected from the group consisting of graphite, graphene, a non-diamond allotrope of carbon, surface modified diamond, BeO, and a Group VIIIA element dispersed in a continuous phase material;
- adhering at least some nanoparticles of the plurality of nanoparticles to the coating material;
- positioning the at least partially coated plurality of core particles and the at least some nanoparticles adhered to the coating material in a mold;
- interbonding at least some at least partially coated core particles of the at least partially coated plurality of core particles by sintering them during a high temperature/high pressure process to form a polycrystalline diamond table; and
- securing the polycrystalline diamond table to a substrate.

11. The method of claim 10, further comprising:
- imparting a first net charge opposite a second net charge of the coating material to the outer surface of the plurality of core particles; and
- imparting a third net charge opposite the second net charge to an outer surface of at least some nanoparticles of the plurality of nanoparticles before interbonding the at least some at least partially coated core particles of the at least partially coated plurality of core particles.

12. The method of claim 10, further comprising at least partially coating the at least some nanoparticles of the plurality of nanoparticles with a coating material comprising an amine terminated group.

13. The method of claim 12, further comprising:
- positioning the plurality of core particles, the coating material, and the at least some nanoparticles of the plurality of nanoparticles in a dispersion comprising another plurality of nanoparticles comprising a material selected from the group consisting of graphite, graphene, a non-diamond allotrope of carbon, surface modified diamond, BeO, and a Group VIIIA element dispersed in a continuous phase material; and
- adhering at least some nanoparticles of the another plurality of nanoparticles to the coating material.

14. The method of claim 13, wherein positioning the plurality of core particles, the coating material, and the at least some nanoparticles of the plurality of nanoparticles in a dispersion comprising another plurality of nanoparticles comprising a material selected from the group consisting of graphite, graphene, a non-diamond allotrope of carbon, surface modified diamond, BeO, and a Group VIIIA element dispersed in a continuous phase material comprises positioning the plurality of core particles, the coating material, and the at least some nanoparticles of the plurality of nanoparticles in a dispersion comprising another plurality of nanoparticles comprising a material different from the material of the at least some nanoparticles of the plurality of nanoparticles.

15. The method of claim 13, further comprising repeating the acts of at least partially coating, adhering, positioning in a dispersion, and adhering a predetermined number of times before interbonding the at least some at least partially coated core particles of the at least partially coated plurality of core particles.

16. The method of claim 10, further comprising derivatizing the outer surfaces of core particles of the plurality of core particles before at least partially coating the plurality of core particles.

17. The method of claim 10, further comprising derivatizing outer surfaces of nanoparticles of the plurality of nanoparticles before positioning the plurality of nanoparticles in the dispersion.

18. The method of claim 10, further comprising cross-linking the coating material before interbonding the at least some at least partially coated core particles of the at least partially coated plurality of core particles.

19. The method of claim 10, further comprising:
- positioning the core particle, the coating material, and the at least some nanoparticles of the plurality of nanoparticles in another dispersion comprising another plurality of nanoparticles comprising a material selected from the group consisting of graphite, graphene, a non-diamond allotrope of carbon, surface modified diamond, BeO, and a Group VIIIA element dispersed in a continuous phase material, wherein the plurality of nanoparticles comprises a charge opposite a charge of the at least some nanoparticles of the plurality of nanoparticles; and
- adhering at least some other nanoparticles of the other plurality of nanoparticles to the at least some nanoparticles of the plurality of nanoparticles before interbonding the at least some at least partially coated core particles of the at least partially coated plurality of core particles.

20. The method of claim 10, wherein at least partially coating the core particle with the coating material comprises at least partially coating the core particle with at least one of polyallylamine and branched polyethylenimine.

* * * * *